(12) United States Patent
Godsk et al.

(10) Patent No.: US 8,100,647 B2
(45) Date of Patent: Jan. 24, 2012

(54) METHOD FOR OPERATING A WIND TURBINE, A WIND TURBINE AND USE OF THE METHOD

(75) Inventors: Kristian Balschmidt Godsk, Ry (DK); Thomas Steiniche Bjertrup Nielsen, Randers SV (DK); Erik Billeskov Sloth, Ronde (DK)

(73) Assignee: Vestas Wind Systems A/S, Randers (DK)

( * ) Notice: Subject to any disclaimer, the term of this patent is extended or adjusted under 35 U.S.C. 154(b) by 13 days.

(21) Appl. No.: 12/625,029

(22) Filed: Nov. 24, 2009

(65) Prior Publication Data

US 2010/0074748 A1    Mar. 25, 2010

Related U.S. Application Data

(63) Continuation of application No. PCT/DK2008/000188, filed on May 21, 2008.

(30) Foreign Application Priority Data

May 31, 2007  (DK) .................. 2007 00787

(51) Int. Cl.
    *F03D 7/04*    (2006.01)
(52) U.S. Cl. .............. 416/1; 415/119; 416/17; 416/31; 416/36; 416/37; 416/41; 416/44; 416/48; 416/61
(58) Field of Classification Search .................. 415/119; 416/1, 17, 31, 36, 37, 41, 44, 47, 48, 61
    See application file for complete search history.

(56) References Cited

U.S. PATENT DOCUMENTS

| | | | | |
|---|---|---|---|---|
| 1,242,196 | A * | 10/1917 | Johansson | 416/47 |
| 2,688,285 | A * | 9/1954 | Stockett | 416/37 |
| 4,193,005 | A * | 3/1980 | Kos et al. | 416/41 |
| 4,329,117 | A * | 5/1982 | Doman | 416/170 R |
| 4,439,105 | A * | 3/1984 | Hohenemser | 416/13 |
| 4,439,108 | A * | 3/1984 | Will | 416/131 |
| 5,354,175 | A * | 10/1994 | Coleman et al. | 416/9 |
| 6,688,841 | B1 | 2/2004 | Wobben | |
| 7,547,985 | B2 * | 6/2009 | Takaichi et al. | 416/1 |
| 7,780,411 | B2 * | 8/2010 | Yan | 416/1 |
| 2004/0081551 | A1* | 4/2004 | Wobben | 415/4.1 |
| 2007/0041837 | A1* | 2/2007 | Ide et al. | 416/147 |

FOREIGN PATENT DOCUMENTS

EP    0995904 A2    4/2000

(Continued)

OTHER PUBLICATIONS

Danish Search Report; PA 2007 00787; Jan. 10, 2008; 1 page.
Bossanyi E A: "Individual Blade Pitch 1-13 Control for Load Reduction" Wind Energy, Wiley, Chichester, GB, vol. 6, Oct. 8, 2002, pp. 119-128, XP008031928 ISSN: 1099-1824.
International Preliminary Report on Patentability; PCT/DK2008/000188; Sep. 24, 2009; 6 pages.

(Continued)

*Primary Examiner* — Christopher Verdier
(74) *Attorney, Agent, or Firm* — Patterson & Sheridan, LLP (57) ABSTRACT

A method for operating a wind turbine having a rotor with a number of wind turbine blades, wherein the rotor's axis of rotation is tilted in relation to the direction of the incoming wind, includes the steps of determining the azimuth angle (A) of the blades and adjusting the pitch angle of the blades in accordance with the azimuth angle (A) to ensure a substantially constant angle of attack (AoA) during at least a full rotation of the rotor. A wind turbine and use of the method are also contemplated.

14 Claims, 7 Drawing Sheets

FOREIGN PATENT DOCUMENTS

| | | |
|---|---|---|
| EP | 1635057 A2 | 3/2006 |
| EP | 1666723 A1 | 6/2006 |
| JP | 2004293527 A | 10/2004 |
| JP | 2005083308 A | 3/2005 |
| WO | 0171183 A1 | 9/2001 |
| WO | 2006090215 A1 | 8/2006 |

OTHER PUBLICATIONS

International Search Report; PCT/DK2008/000188; Mar. 20, 2009; 3 pages.

T. Burton, D. Sharpe, N. Jenkins, E. 1-13 Bossanyi: "Wind Energy Handbook" 2001, John Wiley & Sons, Ltd, Chichester, XP002520400 p. 492-p. 493.

* cited by examiner

PRIOR ART

METHOD FOR OPERATING A WIND TURBINE, A WIND TURBINE AND USE OF THE METHOD

CROSS-REFERENCE TO RELATED APPLICATIONS

The present application is a continuation of pending International patent application PCT/DK2008/000188 filed on May 21, 2008 which designates the United States and claims priority from Danish patent application PA 2007 00787 filed on May 31, 2007, the content of which is incorporated herein by reference.

FIELD OF THE INVENTION

The invention relates to a method for operating a wind turbine, the wind turbine comprising control means and use of the method.

BACKGROUND OF THE INVENTION

Figure 1:
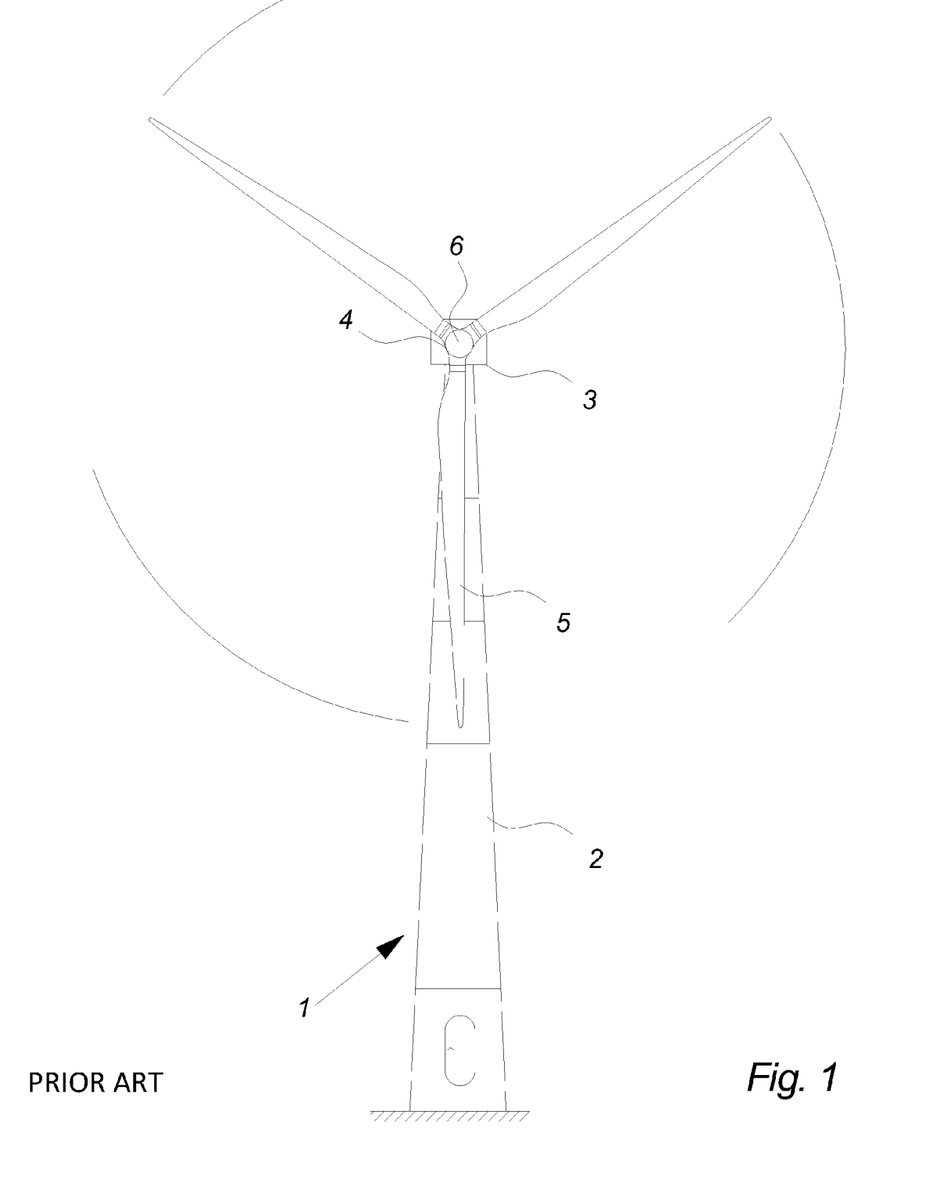
FIG. 1 illustrates a large modern wind turbine as seen from the front.

A wind turbine known in the art comprises a wind turbine tower and a wind turbine nacelle positioned on top of the tower. A wind turbine rotor with a number of wind turbine blades is connected to the nacelle through a low speed shaft, as illustrated in FIG. 1.

One of the consequences of producing power by means of a wind turbine is the generation of noise from the mechanical system (gear, generator, cooling fans, etc.) and the aerodynamic noise from the blades. With off-shore wind turbines, the noise emission is not necessarily an issue but with land based wind turbines noise emission can be a problem if not carefully controlled.

Two of the most important parameters that influence the magnitude of noise generated by the wind turbine are the angular speed of the blade and the angle of attack of the incoming wind that passes the rotating blade.

One way of ensuring an acceptable noise level at locations neighboring the wind turbine is to measure the noise level under given circumstances and then control the operation of the wind turbine (e.g. the rotation speed of the rotor or the blades angle of attack) to ensure that the critical noise level is never reached. But the noise level at a given position near the wind turbine depends on a large number of factors, which often interact, and it is therefore necessary to operate with relatively large margins of safety to the critical noise level to ensure that the critical level is not exceeded under any circumstances.

From U.S. Pat. No. 6,688,841 it is also known to more or less constantly measure the sound level at a location close to a wind turbine park and then reduce the rotational speed of the rotor if a predefined level is exceeded. However, such sound level measurements are subject to uncertainty in that a large number of factors can affect the measurements such as background noise, rain, wind or other and it can be very complex and expensive to establish and operate this system if the noise level at many different locations has to be taken into consideration.

An object of the invention is therefore to provide an advantageous and cost-efficient technique for operating a wind turbine.

SUMMARY OF THE INVENTION

The invention provides a method for operating a wind turbine. The wind turbine comprises a rotor with a number of wind turbine blades, wherein the rotor's axis of rotation is tilted in relation to the direction of the incoming wind. The method comprises the steps of determining the azimuth angle of the blades and adjusting the pitch angle of the blades in accordance with the azimuth angle to ensure a substantially constant angle of attack during at least a full rotation of the rotor.

The rotor-plane of almost all modern wind turbines is tilted slightly to ensure, among other reasons, that the blades do not hit the tower. But this tilt has the effect that, when the blades are moving downwards, they also move slightly forward into the incoming wind, and when they move upwards, they move slightly out of the incoming wind. This will result in that the blades' angle of attack will vary depending on the blades' azimuth position. The blades' angle of attack has a great influence on the blades' noise generation and, by ensuring a substantially constant angle of attack during at least a full rotation of the tilted rotor, a more constant level of noise emission is obtained.

A more constant level of noise emission is, among other reasons, advantageous in that it hereby is possible to reduce the size of the margin of safety and thereby reduce the noise emission from the wind turbine or increase the overall output of the wind turbine.

It should be emphasized that this does not limit the blades to operate at a constant angle of attack at all times. For example, through a more long-term collective pitch control strategy, the pitch angles of the blades can be adjusted in relation to the wind speed, the power output or other, and the present method therefore only attempts to ensure a substantially constant angle of attack during at least a full rotation, i.e. to compensate for the effects of the tilted rotor.

It should also be emphasized that the term "the rotors axis of rotation is tilted in relation to the direction of the incoming wind" is understood to mean that the rotor's axis of rotation is not parallel with the direction of the incoming wind, i.e. the rotor-plane—which is the plane in which the blades of the rotor rotates—is arranged so that the angle of the incoming wind is not perpendicular to said rotor-plane.

In an aspect of the invention, said angle of attack is ensured constant to reduce the noise emission of said rotor.

Modern wind turbines are often operated close to the limits of their capacity to maximise the overall output of the wind turbine. But to do so it has to be ensured that the wind turbines noise propagation is maintained at an acceptable level. It is therefore advantageous to reduce the noise emission by ensuring a substantially constant angle of attack.

In an aspect of the invention, said angle of attack is ensured constant to maintain the noise emission below a predefined level.

Hereby is achieved an advantageous embodiment of the invention.

In an aspect of the invention, said angle of attack is ensured constant to improve the wind turbine's noise emission/output ratio.

Under some circumstances, it is the noise emission of the wind turbine that is the primary factor in limiting the overall power output of the wind turbine, and it is therefore advantageous to improve the wind turbine's noise emission/output ratio.

In an aspect of the invention, the pitch angle of said blades are adjusted so that the trailing edge is moved in direction of the incoming wind, and the leading edge is moved in the opposite direction at least at some point when said blades' azimuth angle is between 0° and 180° i.e. when the blades are moving downwards.

By moving the trailing edge into the incoming wind when the blades are moving downwards, the blades' position in relation to the incoming wind becomes less aggressive in that the blades' angle of attack is reduced for a blade on a modern wind turbine. This is advantageous in that the noise emission hereby can be reduced substantially without changing the output.

In an aspect of the invention, the pitch angle of said blades is adjusted so that the leading edge is moved in direction of the incoming wind and the trailing edge is moved in the opposite direction at least at some point when said blades' azimuth angle is between 180° and 360° i.e. when the blades are moving upwards.

By moving the leading edge into the incoming wind when the blades are moving upwards, the blades' position in relation to the incoming wind becomes more aggressive in that the blades' angle of attack is increased for a blade on a modern wind turbine. This is advantageous in that the output of the blade and hereby the power output of the wind turbine can be increased substantially without changing the noise emission from the blade.

In an aspect of the invention, said pitch angle of said blades are further adjusted in accordance with the current speed of the incoming wind.

A lot of factors affects the blades' angle of attack, and it is therefore not necessarily possible to predict how much the pitch angle shall be adjusted at a given azimuth angle to give a more optimal result. It is therefore advantageous to take the current speed of the incoming wind into account it that it hereby is possible to reduce the noise emission even further or increase the output even further.

In an aspect of the invention, said pitch angle of said blades are further adjusted in accordance with the current rotational speed of said rotor.

It is advantageous to take the current rotational speed of the rotor into account it that it hereby is possible to reduce the noise emission even further or increase the output even further.

In an aspect of the invention, said pitch angle is adjusted when said azimuth angle is between 10° and 170° and between 190° and 350°, preferably between 30° and 150° and between 210° and 330°, and most preferred between 60° and 120° and between 240° and 300°.

The closer the blade is to an azimuth angle of 90° and 270° the more the blade is moving in the direction of the wind, and the present angle ranges therefore present advantageous intervals for adjusting the azimuth angle.

In an aspect of the invention, said pitch angle of said blades can be adjusted individually.

The pitch angle of the blades could be adjusted collectively to simplify the operation of the wind turbine but to increase the positive effects of the present method regarding noise emission, output or both it is advantageous if the blades can be adjusted individually.

In an aspect of the invention, said rotor's axis of rotation is tilted so that the bottom of the rotor-plane is moved into the direction of the incoming wind and the top of the rotor-plane is moved in the direction away from the incoming wind.

Blades of modern wind turbines are very long and slender and therefore also relatively flexible. To ensure that the blades do not strike the tower, even when heavily loaded in high wind speeds, the blades have to pass the tower in a safe distance at all times. This could be ensured by positioning the rotor hub in a great distance from the top of the tower but this would complicate the wind turbine design and entail large torque moments. It is therefore advantageous to tilt the rotor's axis of rotation so that the blades pass the tower in a safe distance.

In an aspect of the invention, said rotor is coned in that one or more of said blades are entirely or partly angled forward in the direction of the incoming wind such as between 1° and 7° forward in relation the rotor-plane.

As explained above the blades of modern wind turbines are very flexible and, to ensure that the blades pass the tower in a safe distance, it is advantageous that the blades are mounted so that they point slightly forward in the direction of the incoming wind, making the rotor-plane cone slightly. However, if the blades are angled too much forward, their efficiency is reduced and the present angle range therefore provides for an advantageous interval in relation to safety and functionality.

The invention also provides for a wind turbine comprising control means for performing a method according to any of the preceding claims.

Providing a wind turbine with control means for performing the previously described method is advantageous in that it hereby is possible in a simple and cost-efficient manner to reduce the noise emission from the wind turbine and/or increase the output of the wind turbine.

In an aspect of the invention, said wind turbine comprises means for adjusting the pitch angle of the blades individually.

In an aspect of the invention, said wind turbine is a variable speed pitch wind turbine.

The noise emission from a variable speed pitch wind turbine is often more unpredictable than the noise emission from other types of wind turbines, and it is therefore particularly advantageous if the wind turbine is a variable speed pitch wind turbine.

Even further the invention provides for use of a method according to any of the previously mentioned methods for reducing noise emission from a wind turbine.

The blades' angle of attack is a principal factor in controlling the blades' noise emission and by adjusting the pitch angle of the blades in accordance with the azimuth angle to ensure a substantially constant angle of attack during at least a full rotation of the tilted rotor is therefore an advantageous method for reducing the noise emission from the wind turbine.

BRIEF DESCRIPTION OF THE DRAWINGS

The invention will be described in the following with reference to the figures in which.

DETAILED DESCRIPTION OF THE INVENTION

FIG. 1 illustrates a wind turbine 1, comprising a tower 2 and a wind turbine nacelle 3 positioned on top of the tower 2. The wind turbine rotor 4, comprising three wind turbine blades 5 mounted on a hub 6, is connected to the nacelle 3 through the low speed shaft which extends out of the nacelle 3 front.

In another embodiment, the wind turbine rotor 4 could comprise another number of blades 5 such as one, two or four.

Figure 2A:
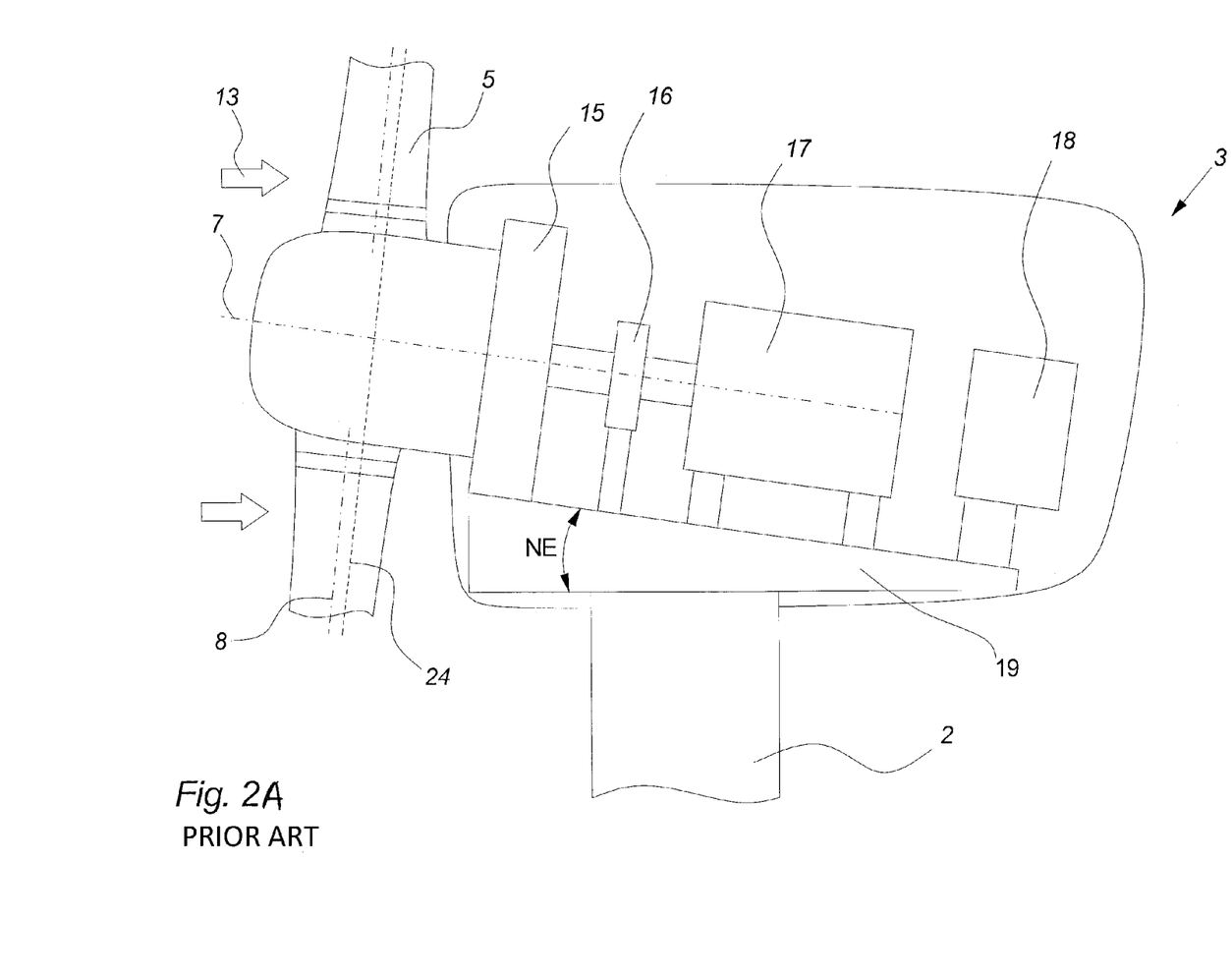
FIG. 2A illustrates a cross section of an embodiment of simplified nacelle known in the art, as seen from the side.

FIG. 2A illustrates a simplified cross section of a nacelle 3 of a prior art wind turbine 1, as seen from the side. Nacelles 3 exists in a multitude of variations and configurations but in most cases the drive train in the nacelle 3 almost always comprise one or more of the following components: a gearbox 15 (typically a epicyclical gearbox), a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3, including the nacelle components 15, 16, 17, 18, is carried by a nacelle structure 19. The components 15, 16, 17, 18 are usually placed on and/or connected to this common load carrying nacelle structure 19. In this simplified embodiment the load carrying nacelle structure 19 only extends along the bottom of the nacelle 3 e.g. in form of a bed frame to which some or all the components 15, 16, 17, 18 are connected. In another embodiment, the load carrying structure 19 could comprise a gear bell which through the main bearings could transfer the load of the rotor 4 to the tower 2, or the load carrying structure 19 could comprise several interconnected parts such as latticework.

The nacelle 3 further comprises a main bearing (not shown) for ensuring that the rotor 4 can rotate substantially freely in relation to the nacelle structure 19 and the fixed drive train parts 15, 16, 17, 18 of the nacelle 3. In this embodiment, the main bearing of the drive train is integrated in the gearbox 15 in that the rotor 4 is connected directly to the gearbox 15 via the hub 6. Because the main bearing 14 is incorporated in the gearbox 15, the gearbox structure has to be able to transfer the entire load of the rotor 4 to the tower 2 by means of the nacelle strengthening structure 19.

In this embodiment, the drive train is established in a normal operation angle NE of 6° in relation to a plane perpendicular to a centre axis through the tower 2 i.e. a horizontal plane. In another embodiment, the rotor 4 and/or drive train could be tilted between 1° and 10°, and preferably between 1.5° and 8°.

By tilting the drive train, the rotor-plane 24 is tilted accordingly making the incoming wind 13 reach the rotor-plane 24 in an angle different from perpendicular. It is evident to a person skilled in the art that, even though the rotor-plane 24 is tilted NE, it might under some conditions occur that the incoming wind 13 reaches the rotor-plane 24 substantially perpendicularly in that the direction of the wind can change e.g. due to high turbulence, changes in the wind direction, obstacles, changes in the terrain or other.

The rotor 4 is tilted e.g. to ensure that the blades 5 do not hit the tower 2, to compensate for the differences in wind speed at the top and bottom of the rotor 4 and/or other.

To further ensure tower clearance of the blades 5, the blades 5 of most modern wind turbines 1 also cone.

In this embodiment of a wind turbine 1, the longitudinal axis 8 of the blades 5 is substantially perpendicular to the rotation axis 7 of the rotor 4. But in another embodiment shown in FIG. 2B, the blades 5 are be mounted in an angle that would make them point slightly forward in relation to the rotor's axis of rotation 7 (i.e. the blades cone slightly) or the rotor 4 could be provided with means for adjusting the angle of the longitudinal axis 8 of the blades 5 in relation to the rotor's axis of rotation 7. This coning can be established by providing the blades with an angle bend somewhere along the length of the blade or by establishing the hub 6 or the mounting surface of the hub 6 in the desired angle. Traditionally the blades 5 cone approximately 2° and about 4° is the maximum coning angle in most cases.

Figure 2B:
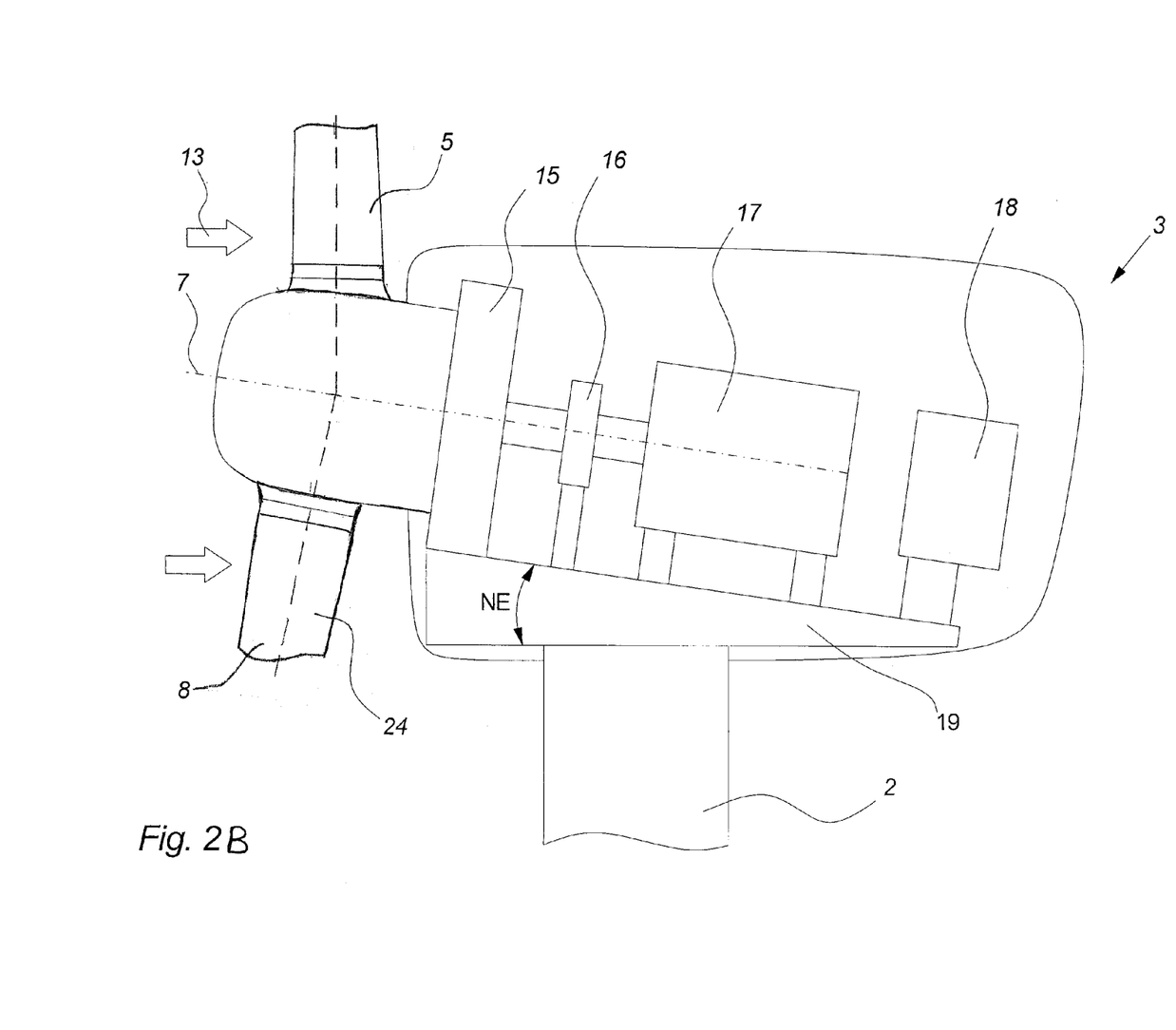
FIG. 2B illustrates a cross section of an embodiments of a nacelle in accordance with the present invention, as seen from the side.

In another embodiment of the invention, the coning angle of the blades 5 could be established and/or controlled individually.

In a further embodiment, the wind turbine 1 could comprise two blades 5 rigidly connected at or near the rotor's axis of rotation 7 where the blades 5 would be connected to the hub 6 through some sort of hinge allowing that the two blades 5 simultaneously could tilt slightly in relation to the rotor's axis of rotation 7. This tilt could then be actively controlled or it could occur as a reaction to specific wind turbine or wind conditions.

Figures 3, 4:
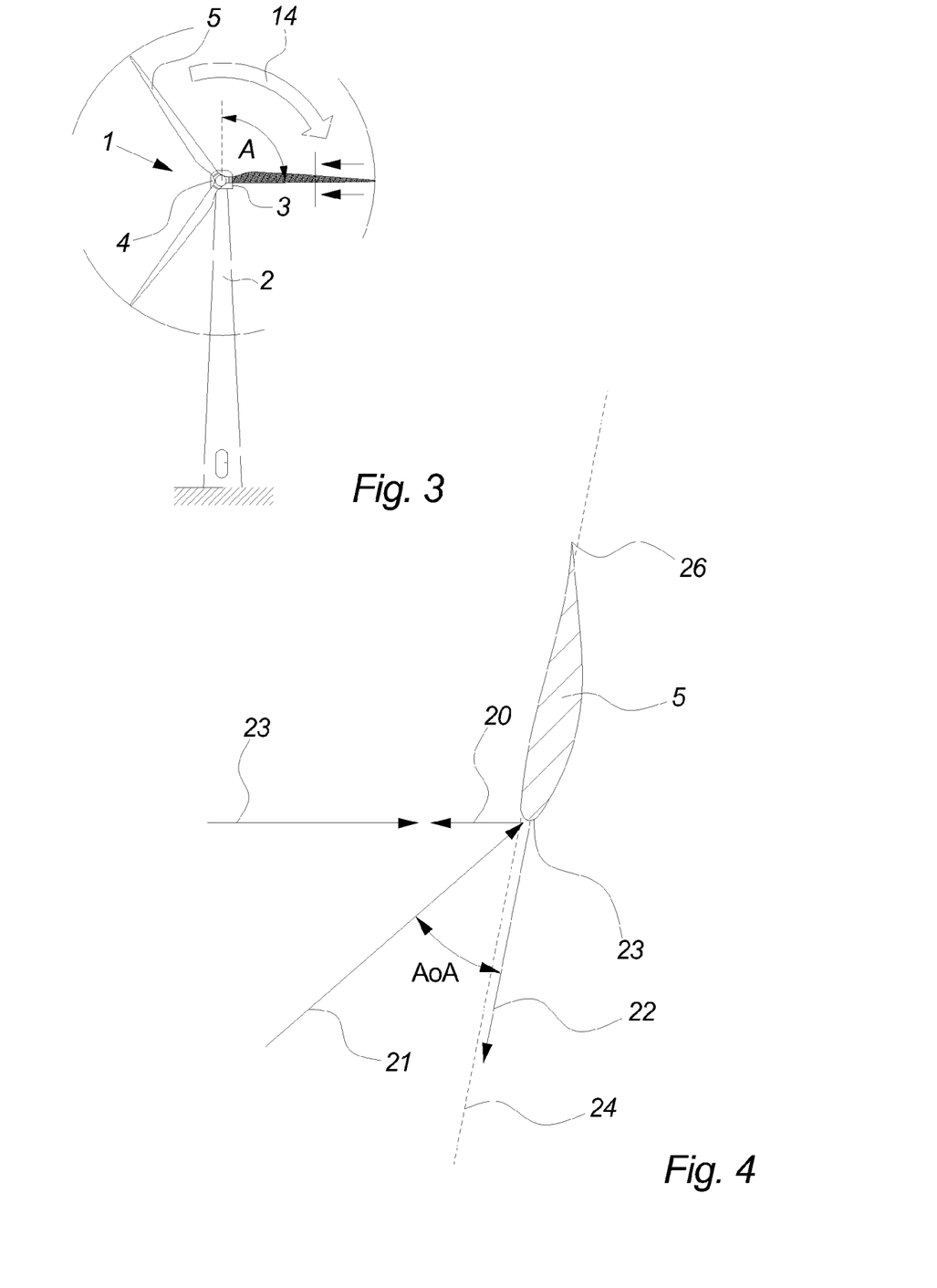
FIG. 3 illustrates a large modern wind turbine with a blade in a 90° azimuth position, as seen from the front.
FIG. 4 illustrates a cross section of the blade illustrated in a 90° azimuth position in FIG. 3, as seen from the side.

FIG. 3 illustrates a large modern wind turbine 1 with a blade 5 in a 90° azimuth position A, as seen from the front.

In this embodiment of a wind turbine 1 according to the invention one of the wind turbines blades 5 is illustrated in a 90° azimuth angle A.

Given the direction of rotation 14 of the rotor 4 of the present wind turbine 1 and because the rotor-plane 24 is tilted, the blade 5 in the 90° azimuth angle A is moving downwards and thereby slightly into the incoming wind 13.

FIG. 4 illustrates a cross section of the blade 5 illustrated in a 90° azimuth position A in FIG. 3, as seen from the side.

When the blade 5 is rotating, the tilt NE and coning of the rotor 4 result in a velocity component in the axial direction 22, that constantly changing magnitude for the blade 5 as function to the azimuth position A.

When the blade 5 is in azimuth position A 90°, the axial velocity 20 of the blade 5 is maximum due to the tilt. Because of the tilt NE and the fact that the blade 5 is moving downwards, the direction of this axial velocity 20 is against the incoming wind 23. This causes the blade 5 to experience a higher incoming wind speed 23, and therefore a higher angle of attack AoA, and also higher relative wind speed 21 passing the blade 5.

As previously explained, one of the most important factors regarding noise emission is the blade's angle of attack AoA, and the blade 5 on the present wind turbine 1 will therefore produce more noise when it is moving downwards and particularly when the blade 5 is in and near the 90° azimuth angle A.

By the method according to the invention it is attempted to compensate for this extra axial speed component 20 by attempting to keep the angle of attack AoA at a substantially constant desired angle by adjusting the pitch angle of the blade 5 so that the trailing edge 26 is moved in direction of the incoming wind 13 and the leading edge 23 is moved slightly out of the incoming wind 13 when the azimuth angle A is between 0° and 180° i.e. when the blades are moving downwards.

It is important to point out that due to other control schemes it can be advantageous to make the angle of attack AoA vary even over a single rotation of the rotor, but according to the present invention it is advantageous to maintain the angle of attack AoA substantially constant to level out the influence of the tilted NE rotor-plane 24, and thereby at least seen over one rotation of the rotor 4 level out the noise and/or power generation of the blade 5.

Exactly how much and when the pitch angle A is adjusted depends on a number of factors. First of all, it depends on the azimuth angle A and, as previously explained, it is at and near 90° and 270° azimuth angle that the problem is most profound when the rotor-plane 24 is tilted so that the incoming wind 13 is not perpendicular with the rotor-plane 24. How much and when the pitch angle A is adjusted can also depend on the actual pitch angle of the blade 5 in the given situation, and the actual pitch angle can depend, for example, on the speed of the incoming wind 23, the rotational speed of the rotor 4, the blade design, and other factors.

Figure 5:
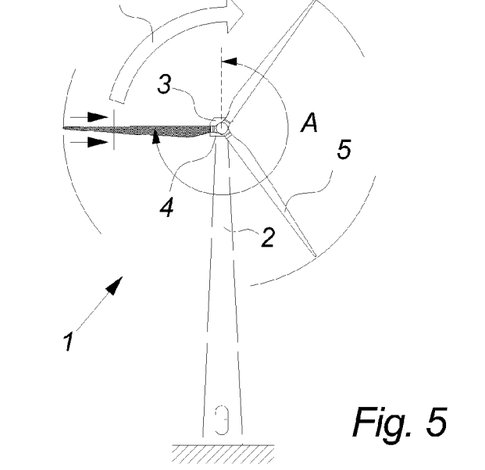
FIG. 5 illustrates a large modern wind turbine with a blade in a 270° azimuth position, as seen from the front.

FIG. 5 illustrates a large modern wind turbine 1 with a blade 5 in a 270° azimuth position A, as seen from the front.

In this embodiment of a wind turbine 1 according to the invention, one of the wind turbines blades 5 is illustrated in a 270° azimuth angle A.

Given the direction of rotation 14 of the rotor 4 of the present wind turbine 1 and because the rotor-plane 24 is tilted, the blade 5 in the 270° azimuth angle A is moving upwards and thereby slightly out of the incoming wind 13.

Figure 6:
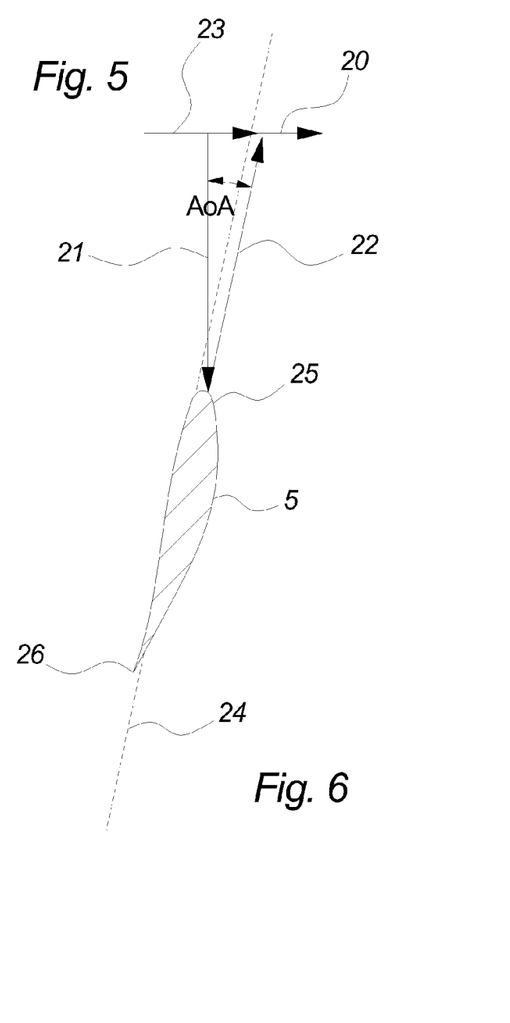
FIG. 6 illustrates a cross section of the blade illustrated in a 270° azimuth position in FIG. 5, as seen from the side.

FIG. 6 illustrates a cross section of the blade 5 illustrated in a 270° azimuth position A in FIG. 5, as seen from the side.

When the blade 5 is in azimuth position A 270°, the flow situation is opposite of what described in FIG. 4. The axial velocity 20 of the blade 5 due to the tilt NE is maximum and the direction is away from the incoming wind 13. That means the blade 5 experiences a lower incoming wind speed 23 and therefore a lower angle of attack AoA and also lower relative wind speed 21 passing the blade 5.

Since the blade's angle of attack AoA is lower than average in this situation, the blade most likely will generate less noise or the noise level will at least not be raised. However, the lower angle of attack AoA can result in a lower output of the blade 5 because the blade 5 is no longer operating at the optimal angle of attack AoA.

In this embodiment of the invention, the pitch angle of the blade 5 is therefore adjusted so that the leading edge 25 is moved in direction of the incoming wind 13 and the trailing edge 26 is moved in the opposite direction at least at some point when the blade's azimuth angle A is between 180° and 360° i.e. when the blade 5 is moving upwards.

Figure 7:
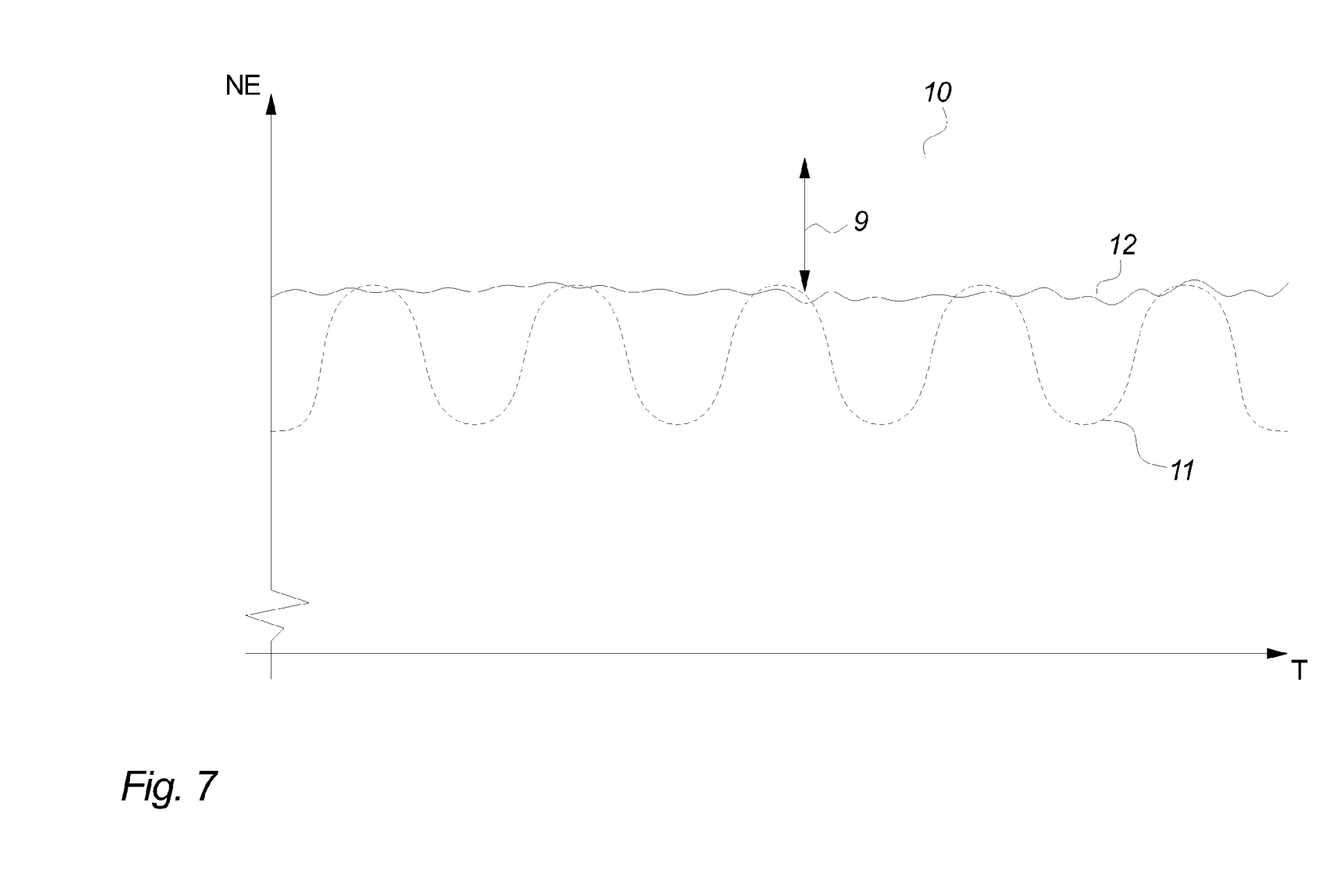
FIG. 7 illustrates the noise emission at different times for a prior art wind turbine and a wind turbine according to the invention.

FIG. 7 illustrates the noise emission at different times for a prior art wind turbine 1 and a wind turbine according to the invention.

In the present system of coordinates, the axis of abscisses represents the amount of noise that the blade 5 emits NE and the axis of the ordinat represents time T.

The upper dotted line 10 illustrates a specific critical noise level that is not to be exceeded if the wind turbine 1 is to comply with the maximum noise emission requirements set out for the specific site.

The distance 9 illustrates the margin of safety to the maximum allowable noise emission 10, which is usually maintained to allow for sudden peaks in the noise emission e.g. due to wind gusts without the maximum allowable noise emission 10 being exceeded.

The dotted curve 11 illustrates the noise emission from a specific blade 5 of a prior art wind turbine 1 with a tilted rotor-plane 24 during five full rotations. As illustrated, the noise emission fluctuates greatly with the azimuth angle A of the blade 5 making the average noise level relatively low and thereby at least to some degree also making the output of the blade 5 relatively low.

The solid curve 12 illustrates the noise emission from a specific blade 5 of a wind turbine 1 according to the invention with a tilted rotor-plane 24 also during five full rotations. When the pitch angle of the blade 5 occasionally or constantly is adjusted to achieve a more constant angle of attack AoA of the blade 5, the noise emission of the blade 5 also becomes more constant and predictable, and it is therefore possible to operate the blade 5 at a higher average noise emission and thereby higher average output without increasing the risk of exceeding the maximum allowable noise emission 10.

Figure 8:
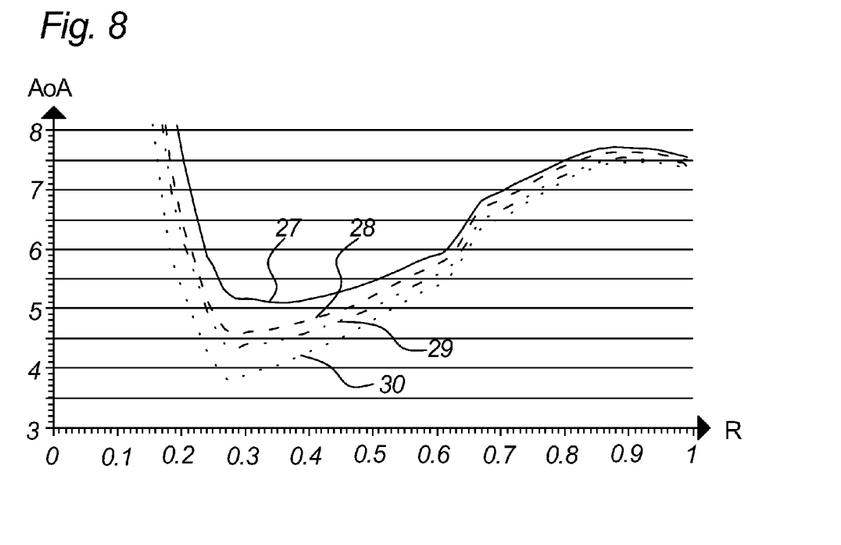
FIG. 8 illustrates a system of coordinates over the angle of attack over the wing span versus azimuth angle for wind speeds at 8 meters/second.
Figure 9:
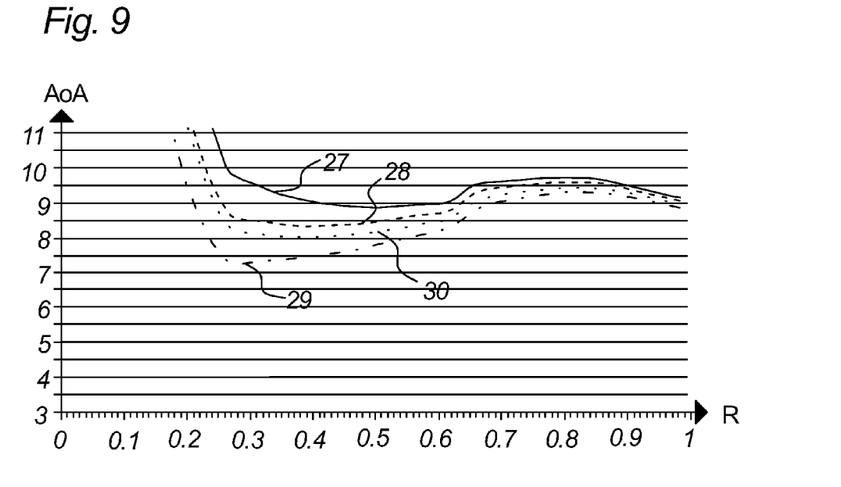
FIG. 9 illustrates a system of coordinates over the angle of attack over the wing span versus azimuth angle for wind speeds at 11 meters/second.

FIGS. 8 and 9 illustrate two systems of coordinates over the angle of attack AoA over the wing span versus azimuth angle A for wind speeds at 8 meters/second and 11 meters/second respectively.

The axis of abscisses represents the angle of attack AoA and the axis of the ordinat represents the wing span where 0 is equivalent to the root of the blade 5 and 1 equivalent to the tip of the blade 5.

The first curve (solid) 27 illustrates a azimuth angle A of 90°, the second curve (broken line) 28 illustrates a azimuth angle A of 0°, the third curve (dash-dot) 29 illustrates a azimuth angle A of 180°, and the fourth curve (dotted line) 30 illustrates a azimuth angle A of 270°.

The two systems of coordinates illustrate that the variation of the azimuth angle A yields large variation of the angle of attack AoA when the blade 5 is in or near azimuth position A 90° and 270°. The difference in angle of attack AoA is especially large at the inner part of the blade 5 due to the influence from the axial velocity 20 from the tilt NE has a relative lager influence on the inner part of the blade 5 because of the much slower speed.

The difference between the azimuth position 0° and 180° (blade in top and bottom position) is due to tilt, coning or the combination of tilt and coning of the rotor 4.

The invention has been exemplified above with reference to specific examples of wind turbines 1, blades 5, control methods and other. However, it should be understood that the invention is not limited to the particular examples described above but may be designed and altered in a multitude of varieties within the scope of the invention as specified in the claims.

What is claimed is:

1. A method for operating a wind turbine comprising a rotor with a number of wind turbine blades, wherein an axis of rotation of said rotor is tilted in relation to a direction of incoming wind, said method comprising the steps of
determining an azimuth angle of the blades and
adjusting a pitch angle of said blades in accordance with said azimuth angle to ensure a substantially constant angle of attack during at least a full rotation of said rotor.

2. The method according to claim 1, wherein the pitch angle of said blades is adjusted so that a trailing edge is moved in the direction of the in-coming wind and a leading edge is moved in the opposite direction at least at some point when said azimuth angle of the blades is between 0° and 180°.

3. The method according to claim 1, wherein the pitch angle of said blades is adjusted so that a leading edge is moved in the direction of the in-coming wind and a trailing edge is moved in the opposite direction at least at some point when said azimuth angle of the blades is between 180° and 360°.

4. The method according to claim 1, wherein said pitch angle of said blades is further adjusted in accordance with a current speed of the incoming wind.

5. The method according to claim 1, wherein said pitch angle of said blades is further adjusted in accordance with a current rotational speed of said rotor.

6. The method according to claim 1, wherein said pitch angle is adjusted when said azimuth angle is between 10° and 170° and between 190° and 350°.

7. The method according to claim 1, wherein said pitch angle of said blades can be adjusted individually.

8. The method according to claim 1, wherein said axis of rotation of said rotor is tilted so that a bottom of the rotor-plane is moved into a direction of an incoming wind and a top of the rotor-plane is moved in a direction away from the incoming wind.

9. The method according to claim 1, wherein said rotor is coned in that one or more of said blades are entirely or partly angled forward in a direc-tion of an incoming wind.

10. A wind turbine comprising control means for performing a method according to claim 1.

11. The wind turbine according to claim 10, wherein said wind turbine comprises means for adjusting the pitch angle of the blades individually.

12. The wind turbine according to claim 10, wherein said wind turbine is a variable speed pitch wind turbine.

13. Use of a method according to claim 1 for reducing noise emission from the wind turbine.

14. The method according to claim 8, wherein said axis of rotation of said rotor is tilted so that the bottom of the rotor-plane is moved between 1 and 7 degrees into the direction of the incoming wind relative to a plane perpendicular to the direction of the incoming wind.

* * * * *